United States Patent
Ito et al.

(10) Patent No.: US 6,954,096 B2
(45) Date of Patent: Oct. 11, 2005

(54) SEMICONDUCTOR INTEGRATED CIRCUIT DEVICE HAVING A SAMPLING SIGNAL GENERATION CIRCUIT

(75) Inventors: Kenji Ito, Anjo (JP); Takuya Harada, Kariya (JP); Hirofumi Isomura, Kariya (JP)

(73) Assignee: Denso Corporation, Kariya (JP)

( * ) Notice: Subject to any disclaimer, the term of this patent is extended or adjusted under 35 U.S.C. 154(b) by 15 days.

(21) Appl. No.: 10/760,489

(22) Filed: Jan. 21, 2004

(65) Prior Publication Data

US 2004/0150431 A1 Aug. 5, 2004

(30) Foreign Application Priority Data

Jan. 22, 2003 (JP) ........................................ 2003-013492

(51) Int. Cl.[7] .............................................. H03K 3/017
(52) U.S. Cl. ...................................... 327/172; 327/291
(58) Field of Search ................................ 327/170–175, 327/291, 379, 24–25, 31, 33, 35

(56) References Cited

U.S. PATENT DOCUMENTS 4,621,224 A * 11/1986 Watabe et al. .............. 318/594
5,901,128 A * 5/1999 Hayashi et al. ........... 369/59.22
6,094,090 A * 7/2000 Yamauchi .................... 327/537

FOREIGN PATENT DOCUMENTS

| JP | 59012314 A | * 1/1984 | .......... G01D/15/06 |
| JP | A-H09-153802 | 6/1997 | |
| WO | WO 9403889 A1 | * 2/1994 | ............ G11B/5/00 |

* cited by examiner

*Primary Examiner*—Timothy P. Callahan
*Assistant Examiner*—Cassandra Cox
(74) *Attorney, Agent, or Firm*—Posz Law Group, PLC

(57) ABSTRACT

A semiconductor integrated circuit device is provided to reduce the adverse effect of PWM noise occurring in a PWM driving section on an analog voltage processing section in an IC, in which digital and analog circuits are combined on a single chip. A sampling signal generation circuit outputs a sampling signal St to an A/D converter at a predetermined time when "delay time td+allowance time ta" has elapsed from a start signal Sp. The delay time td is shorter than "the minimum time width of H level of PWM signal SPWM1-allowance time ta". The delay time td is also time from the variation of level of the PWM signal SPWM1 to actual variation in the passage of current through a power section.

9 Claims, 7 Drawing Sheets

FIG. 3A PWM Spwm1
FIG. 3B PWM Spwm2
FIG. 3C OUTPUT VOLTAGE OF POWER SECTION 8
FIG. 3D VOLTAGE OF POWER SUPPLY LINE 11
FIG. 3E REFERENCE VOLTAGE Vref
FIG. 3F START SIGNAL Sp
FIG. 3G SAMPLING SIGNAL St
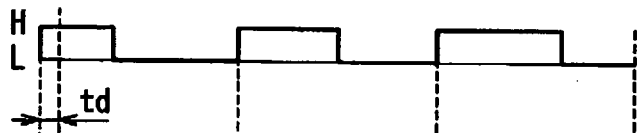
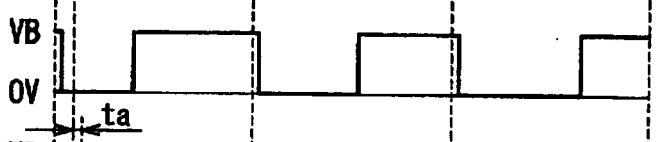
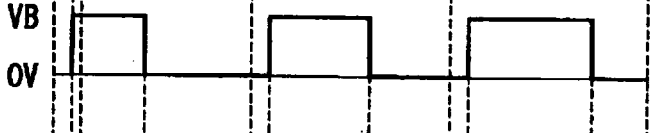
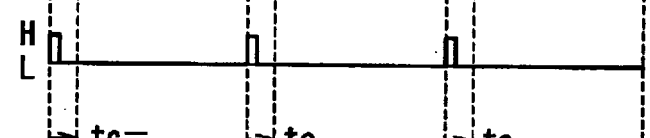
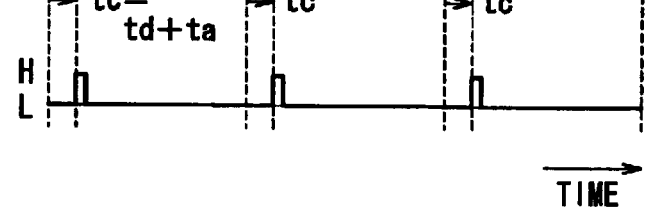

SEMICONDUCTOR INTEGRATED CIRCUIT DEVICE HAVING A SAMPLING SIGNAL GENERATION CIRCUIT

CROSS REFERENCE TO RELATED APPLICATION

This application is based upon, claims the benefit of priority of, and incorporates by reference the contents of, Japanese Patent Application No. 2003-13492 filed on Jan. 22, 2003.

BACKGROUND OF THE INVENTION

1. Field of the Invention

The present invention relates to a semiconductor integrated circuit device in which an analog voltage processing section for sampling and processing analog voltage, and a pulse width modulation (PWM) driving section for generating a PWM driving signal on the basis of digital processing are formed on a semiconductor chip.

2. Description of the Related Art

In some ICs in which digital and analog circuits are combined on a single chip, a master clock in the digital circuit, which is common to other digital circuits, generates a timing signal for determining the sampling time of a sampling processing section included in the analog circuit. In such ICs, there is technology to prevent pulse noise occurring in the digital circuit from adversely affecting the sampling processing of the analog circuit (refer to Japanese Patent Laid-Open Publication No. Hei 9-153802). To realize this technology, the reverse timing of the timing signal is set so as to have a predetermined time difference or more, the amount of which is adequately longer than a delay time per gate of the digital circuit with respect to the rising or falling edge of the master clock.

The technology is effective for a noise source that always has a fixed waveform such as the master clock because the time difference between the reverse timing of the timing signal and the rising or falling edge of the master clock can be set regularly. However, a noise source that has irregular duty ratios, although it may also have a constant period, such as a PWM driving signal for PWM driving of a power device, cannot adopt the technology because the timing of the falling edge (or the rising edge) of the PWM driving signal varies.

Current passing through the power device driven for PWM starts and stops abruptly in accordance with the PWM driving signal. Thus, if, for example, the power device and the IC are connected to a common power source, noise enters an analog voltage processing section in the IC through a power line even when the power device is not mounted on the semiconductor integrated circuit device (IC). Since a motor, a solenoid and the like controlled by the PWM driving has relatively large current carrying capacity, the entry of noise into the analog voltage processing section is a serious problem. This is especially the case in equipment that has to use a battery as a common power source such as car-mounted equipment.

SUMMARY OF THE INVENTION

An object of the present invention is to provide a semiconductor integrated circuit device with analog and digital circuits which reduces the adverse effect of noise occurring in accordance with the operation of a PWM driving section on an analog voltage processing section.

According to means of a first aspect of the present invention, drive current (gate drive current, base drive current or the like) of a driven section (a power device or the like) outputted from a PWM driving section, or current passing through the driven device itself varies in accordance with the variation of level of a PWM driving signal generated by the PWM driving section. Thus, when a semiconductor integrated circuit device is provided with the PWM driving section, pulse-shaped noise occurs in the PWM driving section, at the variation points of level of the PWM driving signal, or at the variation points of the passage of current through the driven section, regardless of whether or not the driven section is mounted on the semiconductor integrated circuit.

A sampling signal generation circuit obtains the variation point of the PWM driving signal from the first level to the second level in order to provide an analog voltage processing section with a sampling signal at a point in time when delay time td elapses from the variation point. The first level corresponds to a condition that, for example, current is interrupted, and the second level corresponds to a condition that current passes through the driven section. The variation point of the PWM driving signal refers to the period start point thereof. Delay time td is time from the variation point to actual variation in the passage of current through the driven device. According to the present means, since the sampling signal is provided while the PWM driving signal is in the second level, it is possible to prevent the overlap in time between noise caused by variation in the PWM driving signal and the sampling signal. It is also possible to generate the sampling signal at regular intervals. Therefore, the analog voltage processing section can precisely sample inputted analog voltage at regular intervals without the adverse effect of noise.

The above means, however, has a possibility that variation in the PWM driving signal from the second level to the first level overlaps with the sampling signal when the duration of the second level of the PWM driving signal is equal to or shorter than delay time td. Accordingly, the means is applicable on condition that delay time td is shorter than the minimum duration of the second level of the PWM driving signal.

In means of a second aspect of the invention, allowance time ta is incorporated into the means of the first aspect. A minimum allowance time ta is ensured between variation in the passage of current through the driven section and the generation of the sampling signal. Allowance time ta as a positive value is properly set so that noise does not overlap with the sampling signal, in consideration of time and the like necessary for variation in current passing through the driven section.

According to means of a third aspect of the invention, the sampling signal generation circuit can obtain the period start point with respect to each period of the PWM driving signal from the PWM driving section.

According to means of a fourth aspect of the invention, the sampling signal generation circuit sets reference time ts in advance, and generates the sampling signal in accordance with the relationship in width between reference time ts and the duration of the second level of the PWM driving signal. Specifically, the sampling signal generation circuit (1) outputs the sampling signal at a point in time when "reference time ts+delay time td" elapses from the period start point, when reference time ts is longer than the duration of the second level, and (2) outputs the sampling signal at a point in time when reference time ts elapses from the period start point, when reference time ts is equal to or shorter than the duration of the second level.

According to the means, the sampling signal generation circuit can generate the sampling signal while avoiding the variation points of the PWM driving signal, the duty ratio of which varies every moment, from the second level to the first level. Therefore, it is possible to prevent the overlap in time between noise caused by variation in the PWM driving signal and the sampling signal. The generation timing of the sampling signal differs only by delay time td in accordance with the relation in width between reference time ts and the duration of the second level, so that the sampling signal is generated at approximately regular intervals. Therefore, the analog voltage processing section can precisely sample inputted analog voltage at approximately regular intervals without the adverse effect of noise.

When reference time ts is extremely short, variation in the PWM driving signal from the first level to the second level may overlap with the sampling signal. When reference time ts is extremely long, on the other hand, the sampling signal may not be generated during a PWM period. Accordingly, reference time ts is set to satisfy the following equation:

delay time $td$<reference time $ts \leq$(period of PWM driving signal−delay time $td$)

In means of a fifth aspect of the invention, allowance time ta is incorporated into the means of the fourth aspect. More fully, a minimum allowance time ta is ensured between variation in the passage of current through the driven section, which responds to the variation of the PWM driving signal from the second level to the first level, and the generation of the sampling signal. In a case of (2) described above, allowance time of at least delay time td is ensured between the generation of the sampling signal and variation in the passage of current through the driven section. Furthermore, when the PWM driving signal varies from the first level to the second level, allowance time ta is ensured. Allowance time ta as a positive value is properly set so that noise does not overlap with the sampling signal, in consideration of time and the like necessary for variation in current passing through the driven section.

According to means of a sixth aspect of the invention, the sampling signal generation circuit can obtain the period start point and the duration of the second level with respect to each period of the PWM driving signal from the PWM driving section.

According to means of a seventh aspect of the invention, sampling is performed a plurality times every PWM period rather than once as discussed above. Generally, when sampling is performed $2^n$ times, the period of the start signal Sp becomes one-$2^n$th of the PWM period, and the pulse width of tp[N-n-1:0] is used. The bit width of the sampling signal generation circuit becomes [N-n-1:0].

BRIEF DESCRIPTION OF THE DRAWINGS

The above and other objects, features and advantages of the present invention will become more apparent from the following detailed description made with reference to the accompanying drawings. In the drawings:

FIGS. 3A–3G are timing charts showing the timing and voltage waveform of each signal related to PWM;

DETAILED DESCRIPTION OF THE PREFERRED EMBODIMENTS (First Embodiment)

A first embodiment of the present invention will be hereinafter described with reference to FIGS. 1 through 3. In this embodiment, a semiconductor integrated circuit device according is adopted as an IC for controlling a car-mounted motor.

Figure 1:
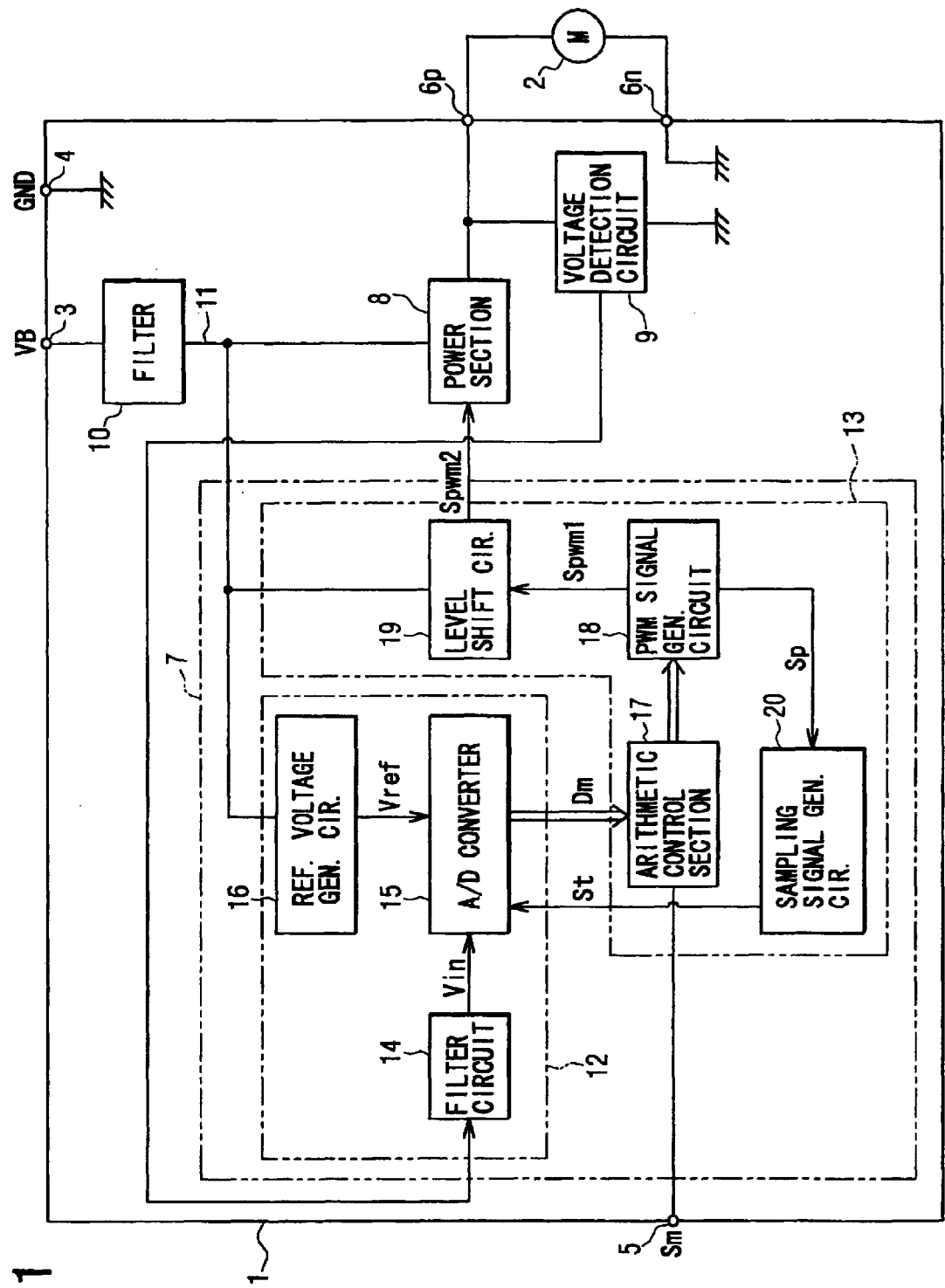
FIG. 1 is a block diagram of a motor driving device according to a first embodiment.

FIG. 1 is a block diagram showing the electrical configuration of a motor driving device 1. The motor driving device 1, disposed in the vicinity of a direct-current motor 2 with a brush installed in a car, rotates the motor 2 in accordance with a command signal Sm from an ECU (Electronic Control Unit) (not illustrated). The motor driving device 1, which operates with power supply voltage from a battery (not illustrated), feedbacks the voltage across the motor 2 in order to keep the voltage applied to the motor 2 (motor applied voltage) constant regardless of the variation of a battery voltage VB. Terminals 3 and 4 are power supply terminals, a terminal 5 is a signal input terminal, and terminals 6p and 6n are motor connection terminals.

The motor driving device 1 comprises an IC 7 for control, a power section 8, a voltage detection circuit 9 for detecting the voltage across the motor 2, and a filter 10 inserted between the terminal 3 and a power supply line 11 in the device. The power section 8 comprises P-channel power MOSFETs (not illustrated) connected in the shape of a high side switch. The power MOSFET is turned on and off in response to a pulse width modulation (PWM) signal Spwm2 outputted from the IC 7. The voltage detection circuit 9 comprises, for example, a resistance potential divider circuit. A diode (not illustrated) for current reflux is connected between the terminals 6p and 6n.

The battery voltage VB applied to the filter 10 is supplied to the IC 7 via the power supply line 11. The IC 7 is provided with a power supply circuit (not illustrated) to generate power supply voltage Vcc (5V, for example) for control on the basis of the battery voltage VB.

The IC 7 is a monolithic IC in which an analog circuit 12 and a digital circuit 13 are formed on a single semiconductor chip. The analog circuit 12 and the digital circuit 13, disposed separately on the semiconductor chip, share the same power supply. Accordingly, noise occurring in accordance with the operation of the digital circuit 13 may enter the analog circuit 12 through the power supply line and the like in the IC. Also, because the IC 7 and the power section 8 share the power supply line 11, there is a possibility that noise occurring in accordance with the on-off action of the power section 8 enters the IC 7.

The analog circuit 12 of the IC 7 comprises a filter circuit 14, an A/D converter 15, and a reference voltage generation circuit 16. The filter circuit 14 averages rectangular signal voltage outputted from the voltage detection circuit 9 to output the average voltage applied to the motor 2. The A/D converter 15 (corresponding to an analog voltage processing section), which samples and holds input voltage Vin (voltage applied to the motor 2) in synchronization with a sampling signal St described later, converts a held analog sampling voltage into digital to output digital data Dm. Reference voltage Vref necessary at that time is generated by the reference voltage generation circuit 16, which may be composed of, for example, a band gap regulator. The reference voltage generation circuit 16 operates under the battery voltage VB.

The digital circuit 13 comprises an arithmetic control section 17 operating under the power supply voltage Vcc, a PWM signal generation circuit 18, a sampling signal generation circuit 20, and a level shift circuit 19 operating under the battery voltage VB. The arithmetic control section 17 which may be composed of, for example, a gate array performs PI control operation and the like on the basis of digital data Dm to keep the motor applied voltage constant. Software rather than hardware may carry out the processing with the use of a CPU.

The PWM signal generation circuit 18 generates a PWM signal Spwm1 on the basis of arithmetic results outputted from the arithmetic control section 17. L level (corresponding to the first level) and H level (corresponding to the second level) of the PWM signal Spwm1 correspond to the off condition and on condition of the power MOSFET constituting the power section 8, respectively for purposes of this discussion. At a variation point from L level to H level, a PWM period starts. The level shift circuit 19 for converting the level of the PWM signal Spwm1 in a 5V system into the PWM signal Spwm2 in a VB voltage system has sufficient current output capacity to drive the power MOSFET. The PWM signal generation circuit 18 outputs a pulse-shaped start signal Sp (refer to FIG. 3F) indicating a start point of the period to the sampling signal generation circuit 20. The PWM signal generation circuit 18 and the level shift circuit 19 integrally correspond to a PWM driving section.

Figure 2:
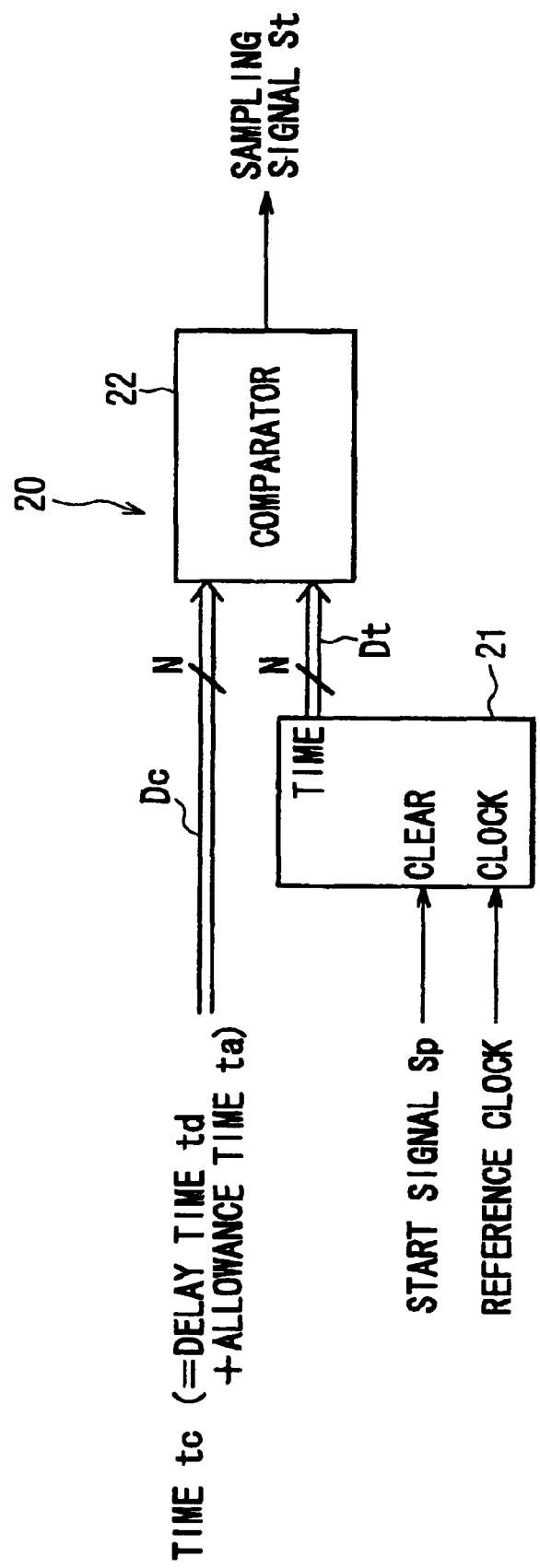
FIG. 2 is a block diagram of a sampling signal generating circuit.

Referring to FIG. 2, the sampling signal generation circuit 20 will be more fully discussed. The sampling signal generation circuit 20 generates a sampling signal St on the basis of the start signal Sp, delay time td, and allowance time ta. Delay time td indicates delay in time from variation in the level of the PWM signal Spwm1 to actual variation in current carried in the power section 8. Allowance time ta indicates allowance in time between the sampling signal St and PWM noise described later.

The sampling signal generation circuit 20 includes a counter 21 that functions as a timer to reset a count to zero in response to the start signal Sp, and outputs digital data Dt of N bits, which represents the count of a reference clock after the release of reset. Digital data Dc of N bits represents time tc (=delay time td+allowance time ta). A comparator 22 compares digital data Dt with digital data Dc, to output the pulse-shaped sampling signal St at a point in time when Dt becomes equal to Dc.

The operation of this embodiment will be hereinafter described with referring to FIGS. 3A–3G, which show the timing and voltage waveform of each signal related to PWM when the duty ratio of PWM abruptly increases. Each waveform indicates (FIG. 3A) signal Spwm1, (FIG. 3B) signal Spwm2, (FIG. 3C) output voltage of the power section 8 (motor applied voltage), (FIG. 3D) voltage of the power supply line 11, (FIG. 3E) reference voltage Vref, (FIG. 3F) start signal Sp, and (FIG. 3G) sampling signal St, from above.

Upon inputting the command signal Sm indicating the start of drive from an ECU to the motor driving device 1, the arithmetic control section 17 performs the PI control operation to keep the motor applied voltage constant. As shown in FIG. 3A, the PWM signal generation circuit 18 generates the PWM signal Spwm1 on the basis of the arithmetic results in the IC 7. The level shift circuit 19 converts the level of the PWM signal Spwm1 in order to output the PWM signal Spwm2 (refer to FIG. 3B) to the power section 8. At this time, when the level of the PWM signal Spwm1 changes, gate drive current for charging and discharging the gate electric charge of the power MOSFET abruptly passes through the level shift circuit 19. Since the current passes from the power supply line 11 to the power supply line inside the IC 7, the inductance of these power supply lines causes pulse-shaped voltage noise.

The power section 8 controls the passage of current through the motor 2 in accordance with the PWM signal Spwm2 to control voltage applied to the motor 2 (refer to FIG. 3C). The PWM control, however, repeats the passage and cut of the current through power supply line 11 connected to the power section 8 in synchronization with the PWM period, so that pulse-shaped voltage noise shown in FIG. 3D, the size of which is larger than that of noise caused by the gate drive current, occurs in the power supply line 11.

Since the reference voltage generation circuit 16 operates from the battery voltage VB, similar noise is superimposed on the generated reference voltage Vref (refer to FIG. 3E), so that the noise enters the A/D converter 15.

The sampling signal generation circuit 20, on the other hand, can output the sampling signal St with timing that does not overlap with PWM noise (refer to FIG. 3G). In other words, the sampling signal generation circuit 20 counts elapsed time t from the start point of the PWM period by use of the counter 21, to output the sampling signal St when an elapsed time t becomes equal to time tc (=delay time td+allowance time ta). Thus, the sampling signal St is generated when the power section 8 is actually turned on and allowance time ta elapses after the PWM signal Spwm1 varies from L level to H level.

Therefore, a sampling signal St generation point is shifted in time from a noise occurrence point at which current starts to pass through the power section 8 by at least allowance time ta, so that the A/D converter 15 can sample the input voltage Vin (motor applied voltage) without PWM noise in accordance with the sampling signal St. The allowance time ta is set properly so that the sampling signal St does not overlap with noise, with considering time necessary for variation in the passage of current through the power section 8.

In using the sampling signal St like this, there is a possibility that the sampling signal St generation point overlaps with the variation point of the PWM signal Spwm1 from H level to L level, if the width of H level of the PWM signal Spwm1 is short. Accordingly, delay time td must be shorter than the "minimum time width tmin−allowance time ta", wherein tmin represents the minimum time width of H level of the PWM signal Spwm1. Generally, the small motor applied voltage loses the linearity between the motor applied voltage and rotational speed, and stops the motor 2. Thus, a lower limit may be set on the duty ratio of the PWM signal Spwm1. In this case, it is confirmed that the minimum time width tmin corresponding to the lower limit of the duty ratio satisfies the above equation.

As described above, the analog circuit 12 including the A/D converter 15 and the digital circuit 13 including the PWM signal generation circuit 18 are mounted on the IC 7 for PWM control which is used in the motor driving device 1 according to this embodiment. The sampling signal generation circuit 20 of the IC 7 can provide the A/D converter 15 with the sampling signal St while the PWM signal Spwm1 is in H level, so that the sampling signal St does not overlap in time with PWM noise, which is caused by the PWM signal Spwm1 and variation in the passage of current through the power section 8. Since a minimum allowance time ta is ensured between variation in the passage of current through the power section 8 and the generation of the sampling signal St, it is possible to further reduce the effect of PWM noise on the voltage sampling of the A/D converter 15.

Furthermore, time tc from the start point of the PWM period to the generation of the sampling signal St is set at a predetermined value and the sampling signal St is accordingly generated at regular intervals. Therefore, the A/D converter 15 can sample the inputted analog voltage with precision at regular intervals, without the adverse effect of noise.

(Second Embodiment)

The second embodiment of the present invention will be hereinafter described with reference to FIGS. 4 and 5.

A motor driving device according to this embodiment has similar function to the motor driving device 1 described in the first embodiment, but the configuration of a sampling signal generation circuit is different. The PWM signal generation circuit 18 (refer to FIG. 1) outputs the duty ratio of the PWM signal Spwm1 of each PWM period, in addition to the start signal Sp, to the sampling signal generation circuit 23 (refer to FIG. 4). The PWM signal generation circuit 18, however, actually outputs digital data Dp that is substantially equal to the duty ratio instead of the duty ratio. Digital data Dp represents a width of the H level of the PWM signal Spwm1 (pulse width tp). Digital data Dp of N bits is represented by data of 0 to $2^N-1$ with dividing the PWM period T (a fixed value) into $2^N$.

Figure 4:
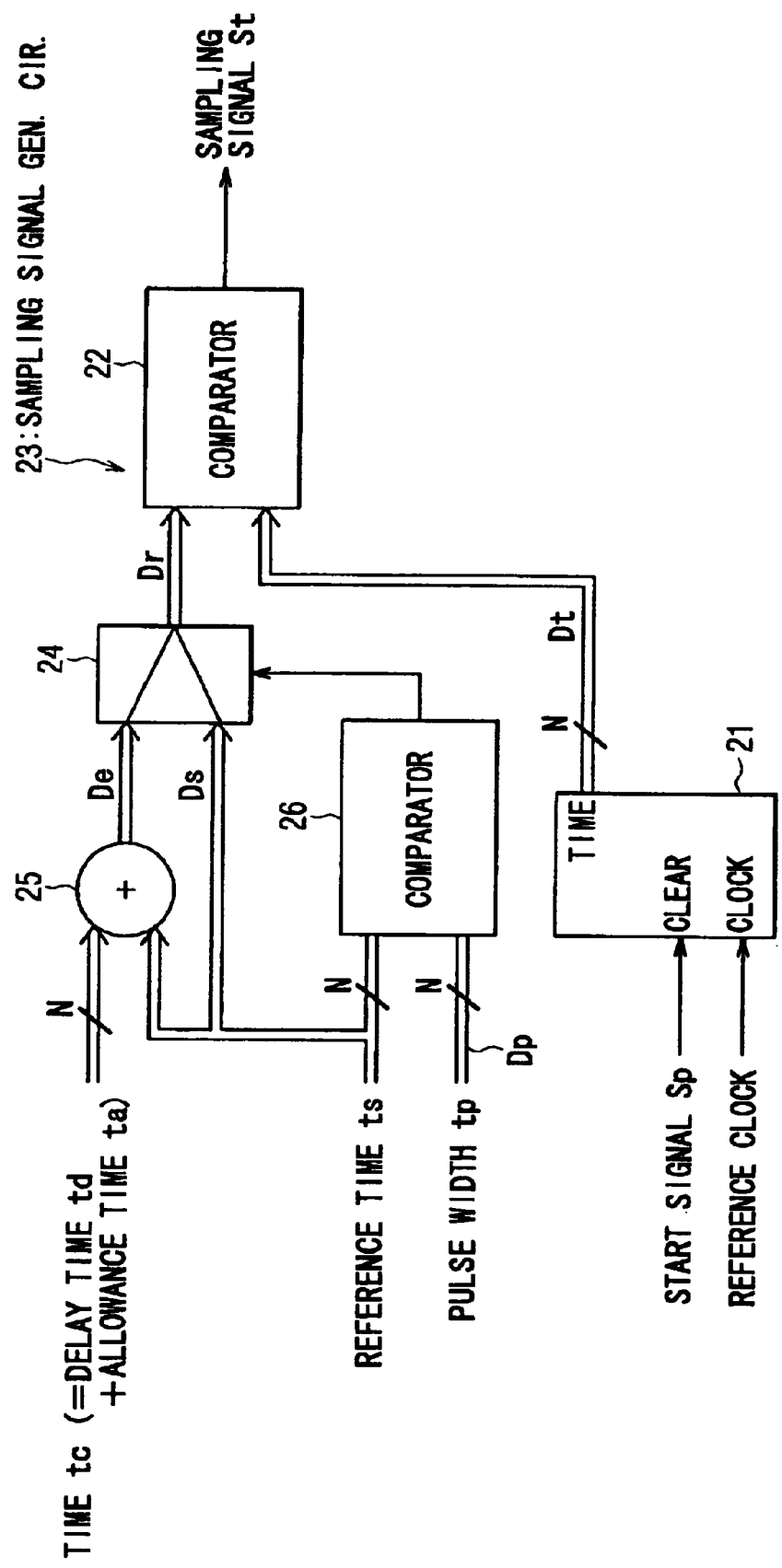
FIG. 4 is a block diagram of a sampling signal generating circuit according to a second embodiment.
Figure 5:
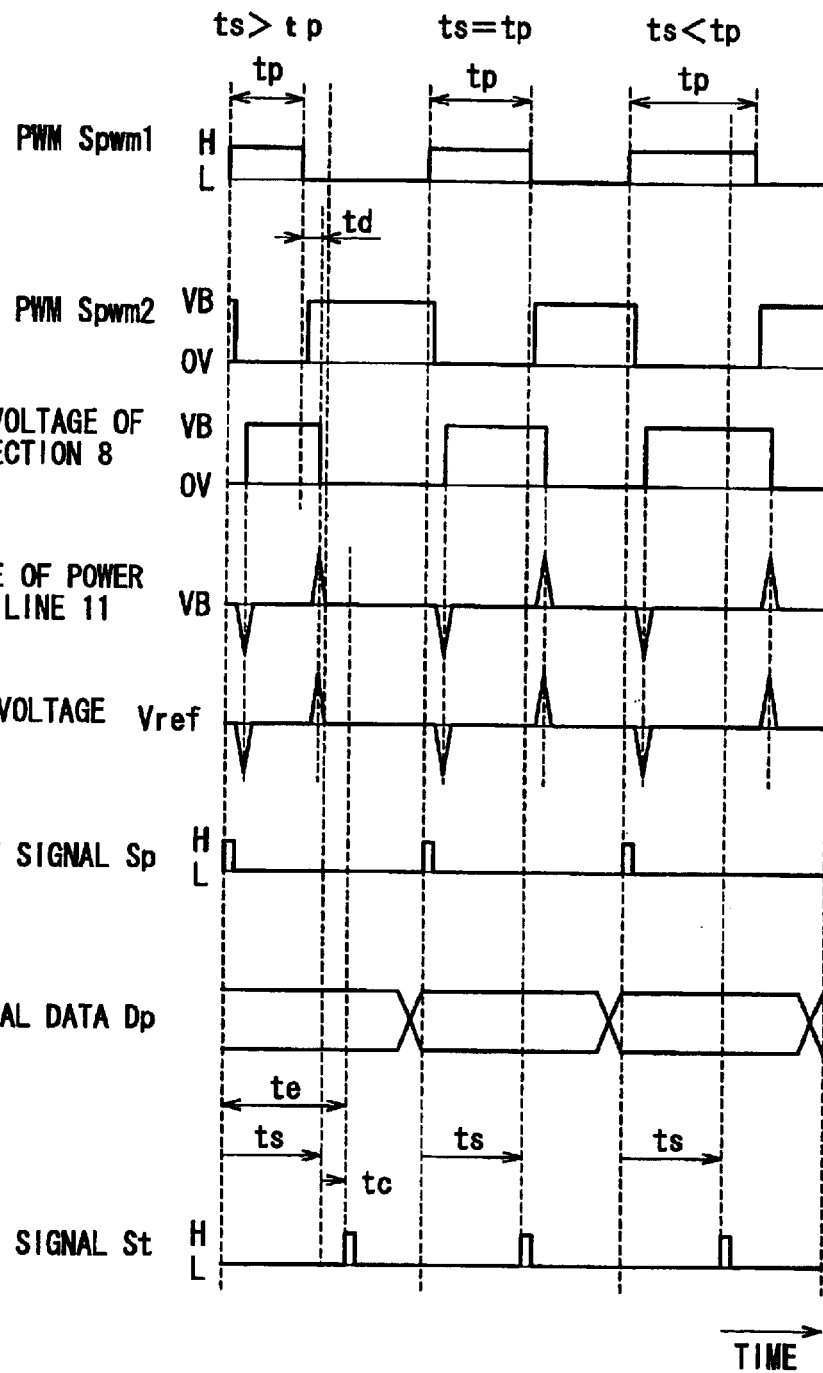
FIGS. 5A–5H are timing charts showing the timing and voltage waveform of each signal related to PWM according to the second embodiment.
Figure 6:
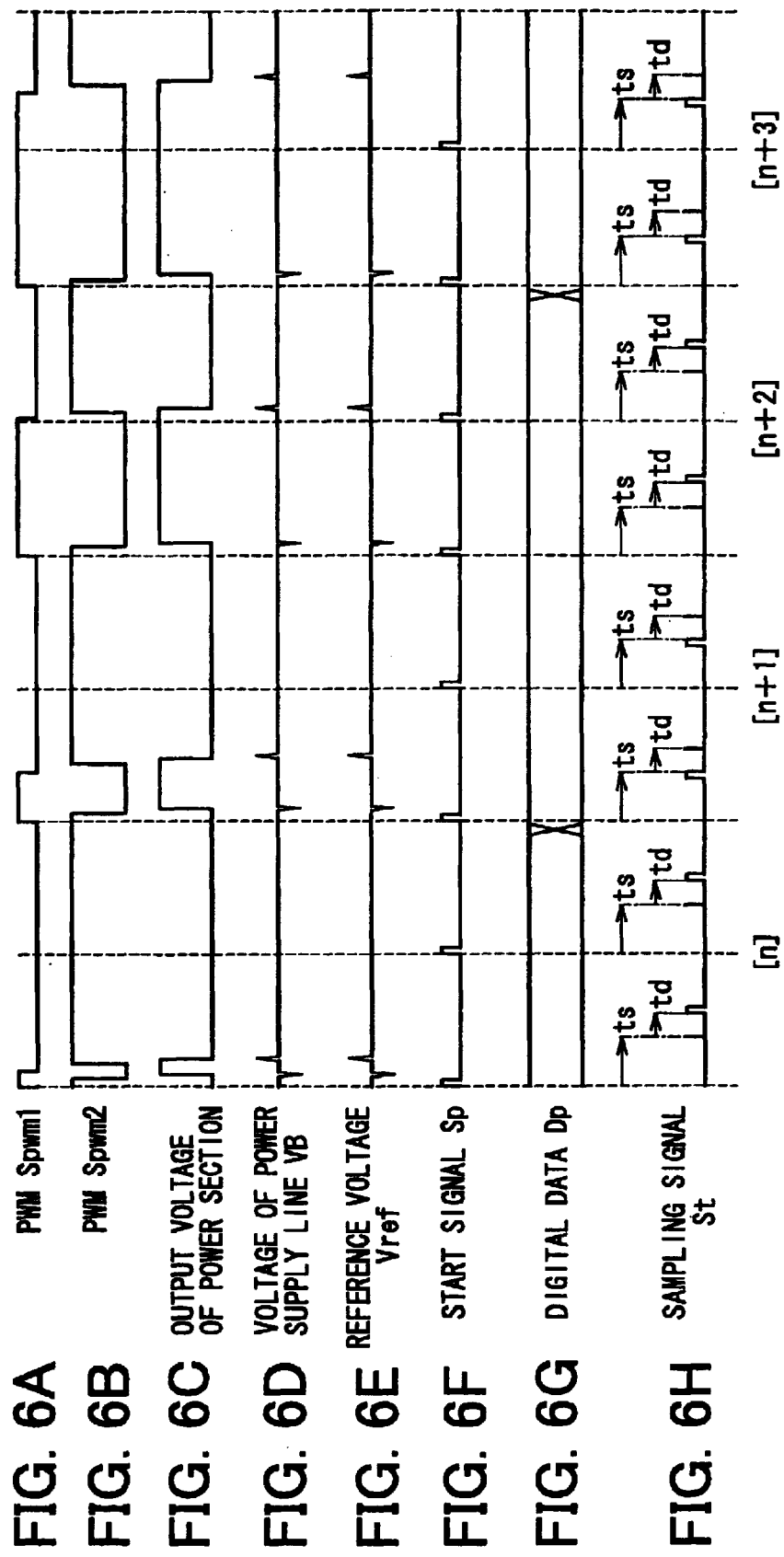
FIGS. 6A–6H are timing charts showing the timing and voltage waveform of each signal related to PWM according to a third embodiment.

In FIG. 4 showing the configuration of the sampling signal generation circuit 23 according to the second embodiment. Identical parts as the embodiment of FIG. 2 are referred to by the same reference numbers. The comparator 22 compares digital data Dt corresponding to elapsed time t from the start point of the PWM period with output data Dr of a selector 24, to output a pulse-shaped sampling signal St at a point in time when Dt becomes equal to Dr.

Two types of data are inputted into the selector 24. One type of data is digital data Ds corresponding to reference time ts, and the other is digital data De that corresponds to time te (=reference time ts+delay time td+allowance time ta) obtained by use of an adder 25. The correspondence between time ts and digital data Ds, and between time te and digital data De is the same as the correspondence between the pulse width tp and digital data Dp described above. The width of reference time ts is predetermined to fix the generation timing of the sampling signal St, as described later.

The selector 24 is switched by an output signal from a comparator 26. In other words, the comparator 26 comparing digital data Dp with digital data Ds makes the selector 24 select digital data De when Ds is more than Dp, and makes the selector 24 select digital data Ds when Ds is equal to or less than Dp.

The operation of this embodiment will be hereinafter described with reference to FIGS. 5A–5F, which show the timing and voltage waveform of each signal related to PWM when the duty ratio of PWM abruptly increases. Signals and voltage shown in FIGS. 5A to 5F are the same as those shown in FIGS. 3A to 3F. FIGS. 5G and 5H indicate digital data Dp and sampling signal St, respectively.

The sampling signal generation circuit 23 adjusts the output timing of the sampling signal St on the basis of whether or not reference time ts newly brought in this embodiment is longer than the pulse width tp of H level of the PWM signal Spwm1. Namely, when reference time ts is longer than the pulse width tp, the sampling signal St is outputted at a point in time when time te (=reference time ts+delay time td+allowance time ta) elapses from the start point of the PWM period.

Thus, the power section 8 is actually turned off in response to variation in the PWM signal Spwm1 from H level to L level, and the sampling signal St is generated after a minimum allowance time ta elapses. The generation point of the sampling signal St deviates from the generation point of noise, at which the passage of current through the power section 8 is interrupted, by a minimum allowance time ta. Therefore, the A/D converter 15 can sample the input voltage Vin (the motor applied voltage) without PWM noise in accordance with the sampling signal St. Allowance time ta is properly set from the same point of view as the first embodiment.

When reference time ts is equal to or less than the pulse width tp, on the other hand, the sampling signal St is outputted at a point in time when reference time ts elapses from the start point of the PWM period. Thus, the sampling signal St is generated while the PWM signal Spwm1 is in H level. When reference time ts is equal to the pulse width tp, the allowance in time between the sampling signal St and the noise occurrence point becomes minimum. Even in this case, however, an allowance for delay time from the PWM signal Spwm1 to the PWM signal Spwm2, or for delay time td from the PWM signal Spwm1 to variation in the passage of current through the power section 8 is ensured. Therefore, the A/D converter 15 can sample the input voltage Vin without PWM noise.

An extremely short reference time ts may cause the overlap between the point of variation of the PWM signal Spwm1 from L level to H level and the generation point of the sampling signal St. Reference time ts is set to satisfy the following equation to ensure allowance time ta between them, r:

delay time td+allowance time ta<reference time ts.

When reference time ts is extremely long, on the other hand, the sampling signal St may not be generated during the PWM period. To generate the sampling signal St during the PWM period, reference time ts is set to satisfy the following equation:

reference time ts≦the period of a PWM driving signal−delay time td−allowance time ta.

As described above, according to the sampling signal generation circuit 23 of this embodiment, the sampling signal St is generated while avoiding the variation points of the PWM signal Spwm1, the duty ratio of which varies every moment, from H level to L level. Therefore, it is possible to prevent the overlap in time between PWM noise, caused by variation in the PWM signal Spwm1 or in the passage of current through the power section 8, and the sampling signal St. In this case, a minimum allowance time ta is ensured from variation in the passage of current through the power section 8 to the generation of the sampling signal St. Setting a lower limit for reference time ts makes it possible to ensure allowance time ta for the variation point of the PWM signal SPWM1 from L level to H level. Therefore, it is possible to reduce the effect of PWM noise on voltage sampling by the A/D converter 15.

The generation timing of the sampling signal St varies in accordance with the relation in width between reference time ts and the pulse width tp, by "delay time td+allowance time ta". The time of "delay time td+allowance time ta", however, is sufficiently shorter than the PWM period T, so that the sampling signal St is generated at approximately regular intervals. Therefore, the A/D converter 15 can precisely sample the inputted analog voltage at approximately regular intervals without the effect of noise.

(Third Embodiment)

In the first and second embodiments, sampling is performed one time per PWM period. In the third embodiment, which develops the second embodiment, sampling is performed a plurality of times. When sampling is performed two times, the third embodiment differs from the second embodiment in the following ways:

(1) Generate the start signal Sp at a half period of the PWM period, and clear a timer two times per PWM period.
(2) Use lower-order bits tp[N-2:0] of tp[N-1:0] as pulse width, instead of the highest-order bit tp[N-1].
(3) The bit width of the sampling signal generation circuit becomes [N-2:0] in accordance with (2).

Figure 7:
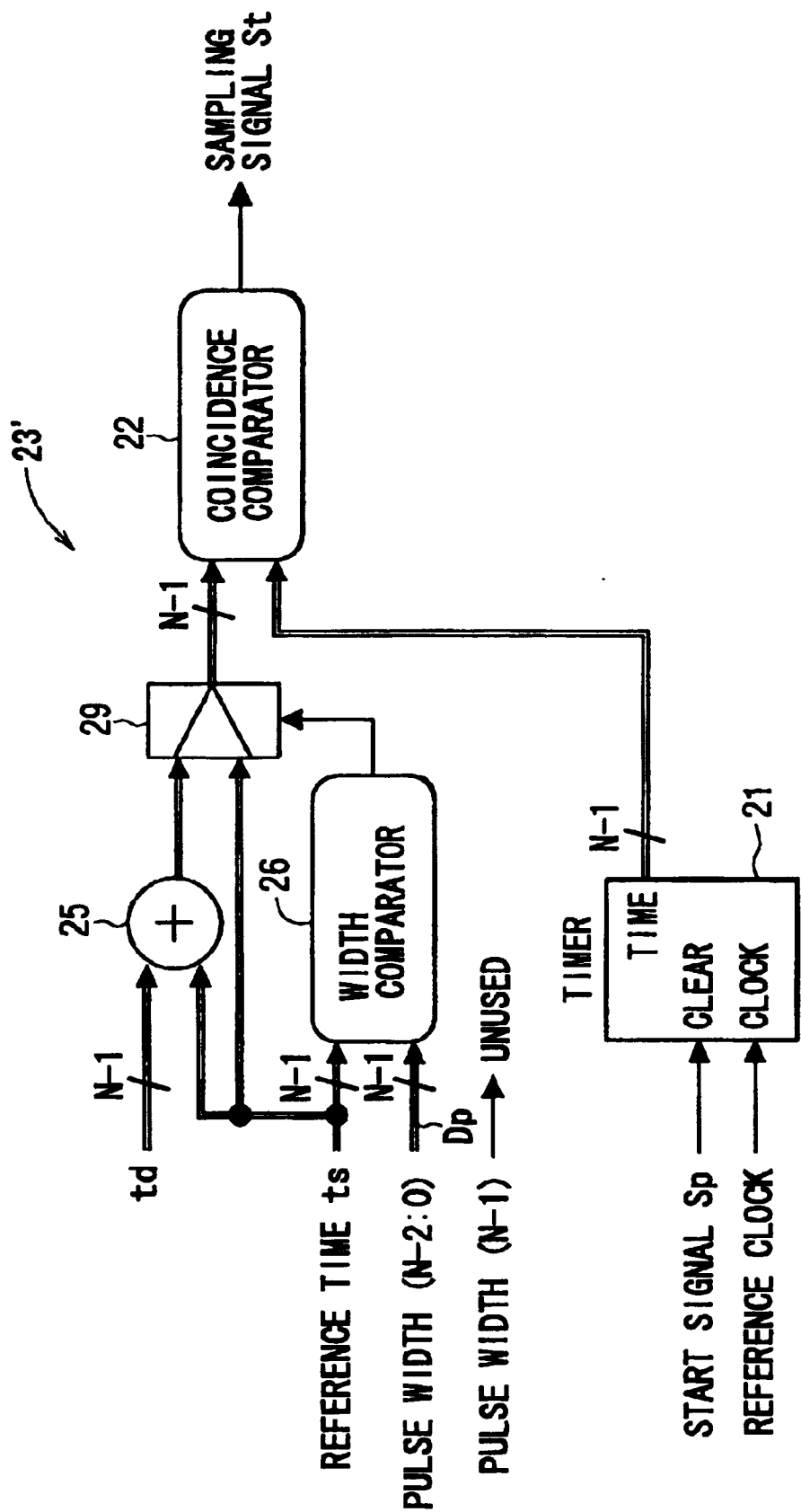
FIG. 7 is a block diagram of a sampling signal generating circuit according to the third embodiment.

FIGS. 6A–6H are timing charts and FIG. 7 is a block diagram of the sampling signal generation circuit according to the third embodiment.

When sampling is performed four times per PWM period, the period of the start signal Sp becomes a quarter of the PWM period, and the pulse width of tp[N-3:0] is used. The bit width of the sampling signal generation circuit becomes [N-3:0]. Generally, when sampling is performed $2^n$ times, the period of the start signal Sp becomes one-$2^n$th of the PWM period, and the pulse width of tp[N-n-1:0] is used. The bit width of the sampling signal generation circuit becomes [N-n-1:0].

(Other Embodiments)

The present invention is not limited to the above description and drawings, various modifications and upgrades are available as follows, for instance.

Allowance time ta is set in each of the above embodiments, but allowance time ta may be set at zero (0) when, for example, the passage of current through the power section 8 varies in a sufficiently short time.

The sampling signal generation circuit 20 and 23 may perform processing by software with the use of a CPU, instead of hardware.

The IC 7 is generally applicable to a control device needing PWM control such as a solenoid control device, a lump dimmer device, an inverter device and the like, in addition to the motor driving device. The motor driving device 1 may drive a brushless direct-current motor or an alternating-current motor.

In the above embodiments, the analog voltage processing section is the IC with the A/D converter, but the present invention is also applicable to an IC including an analog circuit such as a sample hold circuit, a comparator or the like, which is adversely affected by noise in general.

Similar effect is obtained in an IC containing the power section 8. In this case, it is assumed that PWM noise further increases in the IC, so that the present invention results in greater effect.

Therefore, the present disclosure discloses a sampling signal generation circuit 20, 23, 23' for generating a sampling signal for an analog voltage processing section 12 based upon a PWM driving signal generated by a PWM driving section 18. The sampling signal generation circuit 20, 23, 23' comprises a timing device 21 for acquiring a variation point of the PWM driving signal, the variation point being a transition from a first level to a second level, wherein the variation point is acquired based on a condition that a delay time td is shorter than at least a minimum duration of the second level of the PWM driving signal, wherein the variation point defines a period start point of a PWM period defined by the first level and second level of the PWM driving signal, wherein the delay time td is defined as time from variation of level of the PWM driving signal to actual variation in the passage of current through the driven section 2. The sampling signal generation circuit 20, 23, 23' also includes a comparator 22 for providing the analog voltage processing section with the sampling signal at a predetermined point in time when the delay time td elapses from the period start point.

In second and third embodiments, the sampling signal generation circuit 23, 23' generates the sampling signal also based upon the pulse width (or duty ratio) of the PWM driving signal. More fully, in the second and third embodiments the comparator 22 is further for generating the sampling signal when an elapsed time from the start point of the PWM period is substantially equal to De when Ds is more than Dp, and for generating the sampling signal when the elapsed time is substantially equal to Ds when Ds is substantially equal to or less than Dp, wherein De is representative of a summation of a reference time ts, the delay time td and an allowance time ta, wherein Ds is representative of a summation of the reference time ts and wherein Dp is representative of the pulse width of the PWM driving signal.

In a third embodiment, the sampling signal generation circuit 23' generates the sampling signal a plurality of times in each PWM period.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A semiconductor integrated circuit device formed on a semiconductor chip comprising:
    an analog voltage processing section for sampling analog voltage in synchronization with a sampling signal and processing the analog voltage;
    a PWM driving section for generating a PWM driving signal on the basis of digital processing, to provide a driven section with the PWM driving signal; and
    a sampling signal generation circuit for acquiring a variation point of the PWM driving signal from a first level to a second level, wherein the variation point defines a period start point, wherein the variation point is acquired based on a condition that delay time td is shorter than at least a minimum duration of the second level of the PWM driving signal, wherein the delay time td is defined as time from variation of level of the PWM driving signal to actual variation in the passage of current through the driven section, and for providing the analog voltage processing section with a sampling signal at a predetermined point in time when the delay time td elapses from the period start point of the PWM driving signal.

2. The semiconductor integrated circuit device according to claim 1, wherein the sampling signal generation circuit provides the analog voltage processing section with the sampling signal at a point in time when "the delay time td+allowance time ta" elapses from the period start point of the PWM driving signal, wherein the delay time td is shorter than "a minimum duration of the second level–the allowance time ta", and wherein the allowance time ta is longer than zero.

3. The semiconductor integrated circuit device according to claim 2, wherein the PWM driving section outputs the period start point with respect to each period of the PWM driving signal.

4. The semiconductor integrated circuit device according to claim 1, wherein the PWM driving section outputs the period start point with respect to each period of the PWM driving signal.

5. A semiconductor integrated circuit device formed on a semiconductor chip comprising:

an analog voltage processing section for sampling analog voltage in synchronization with a sampling signal and processing the analog voltage;

a PWM driving section for generating a PWM driving signal on the basis of digital processing and for providing a driven section with the PWM driving signal; and a sampling signal generation circuit for setting reference time ts in advance so as to satisfy the following equation:

delay time $td$<reference time $ts$≦(period of PWM driving signal−delay time $td$)

wherein the delay time td is defined as time from variation of level of the PWM driving signal to actual variation in the passage of current through the driven section, wherein the sampling signal generation circuit acquires a variation point of the PWM driving signal from a first level to a second level, the variation point defining a period start point, and also acquires a time width of the second level at the period, wherein when the reference time ts is longer than the duration of the second level, the sampling signal generation circuit provides the analog voltage processing section with a sampling signal at a point in time when "the reference time ts+the delay time td" elapses from the period start point of the PWM driving signal, and wherein when the reference time ts is shorter than the duration of the second level, the sampling signal generation circuit provides the analog voltage processing section with the sampling signal at a point in time when the reference time ts elapses from the period start point.

6. The semiconductor integrated circuit device according to claim 5, wherein the sampling signal generation circuit sets the reference time ts in advance to satisfy following equation:

(the delay time $td$+the allowance time $ta$)<the reference time $ts$≦(the period of PWM driving signal−the delay time $td$−the allowance time $ta$)

wherein the allowance time ta is greater than zero, to provide the analog voltage processing section with the sampling signal at a point in time when "the reference time ts+the delay time td+the allowance time ta" elapses from the period start point, when the reference time ts is longer than the duration of the second level.

7. The semiconductor integrated circuit device according to claim 6, wherein the PWM driving section outputs the period start point and the duration of the second level with respect to each period of the PWM driving signal.

8. The semiconductor integrated circuit device according to claim 5, wherein the PWM driving section outputs the period start point and the duration of the second level with respect to each period of the PWM driving signal.

9. The semiconductor integrated circuit device according to claim 5, wherein the PWM driving section outputs the period start point a plurality of times during each period of the PWM driving signal so that sampling is performed a plurality of times in each period.

* * * * *